Patented Nov. 28, 1933

1,937,489

UNITED STATES PATENT OFFICE 1,937,489

CATALYST AND METHOD OF PRODUCING SAME

Leslie G. Jenness, Brooklyn, N. Y., assignor to Intermetal Corporation, New York, N. Y., a corporation of Delaware No Drawing. Application April 25, 1933
Serial No. 667,833

24 Claims. (Cl. 23—234)

This invention relates to catalysts and catalytic materials and processes of producing the same, and more particularly includes a novel method of preparing such materials in a form capable of a very high degree of activity. The process of the invention is applicable to the preparation of metals and of metal compounds for catalytic purposes. The product resulting from the process of the invention, whether metal or compound, may be chemically identical with catalysts at present in use but, physically, it possesses a structure unlike any catalyst hitherto known. For instance, a manganese dioxide prepared by this process may be identical with that represented by the formula $MnO_2$; a nickel or copper catalyst of the invention may be chemically indistinguishable from ordinary nickel or copper; but in each case there is a marked difference from these known materials in physical characteristics. It is believed that the exceptionally high degree of activity is attributable to the peculiar physical characteristics of the product.

The process of the invention may be briefly described as comprising the treatment of a uniform aggregate or combination containing the desired material or materials of which the ultimate catalyst is to be composed, and also one or more undesired materials, with an agent inactive with respect to the desired material, but adapted to take up the undesired constituents and substantially remove them. The treatment may be effected with any agent adapted to remove the undesired material but will be understood best by reference to a liquid solvent used as a leach. Such a leach results in a product comprising particles in a loosely knit foraminate form consisting substantially of the desired constituent. This condition is undoubtedly caused by the action of the solvent upon the soluble portions of the particles not only on the surfaces but even in the interior in so far as the solvent can gain access to them. It is, therefore, possible, and even probable, that some of the material, undesirable for the special purpose of the particular catalyst to be prepared, may remain in the final product. But in such case it may be so situated in the mass of the particles that it is so surrounded or sealed by the desired material that the solvent may not effectively be enabled to act upon it during the treatment period.

It is, also, to be observed that a given constituent contained in the aggregate from which the process begins, although undesirable in a catalyst for one purpose, may be the desired constituent to be retained in the final product constituting the catalyst for another purpose. Thus, if a catalyst for another purpose is to be prepared, the same aggregate may be treated with a different solvent or other type of agent adapted to remove constituents unsuitable for the particular purpose of the catalyst desired and thus substantially remove them from the final product although these same constituents might be those to be desired and retained in a catalyst prepared from the same aggregate for another purpose.

According to the present invention, therefore, the beginning material might be an aggregate consisting of one or more elements or compounds, such as manganese dioxide, iron oxide, nickel oxide, aluminum oxide, or any number of other metal compounds or metals constituting the aggregate of such material. This aggregate is then treated with an agent adapted to remove the constituents that are undesirable for the particular purpose for which the catalyst is to be prepared. After such treatment the final catalytic material consists of the desired constituent in a corroded, foraminate condition; and this might be manganese dioxide, iron oxide, nickel oxide, aluminum oxide, or other metal compounds. By a subsequent treatment also within the invention, the metal oxide or other metal compound may, when it is advantageous to do so, be reduced to the metal without destroying the corroded foraminate forms. It is evident, therefore, that the catalytic activity of the catalyst of the present invention depends to a large extent upon the physical structure of the particles making up the catalyst regardless of the material composing it.

The above described loosely knit structure in the particle may not accurately be termed porous in the sense in which that term is used to describe certain forms of catalytic material formed by precipitating very finely divided particles all of the same nature which to a certain extent agglomerate, leaving spaces between the agglomerated particles. But the foraminate structure of the present invention is in reality a skeleton of the particle itself resulting from corrosion or etching by the agent used in such treatment which may be a solvent.

The foraminate structure of the particle of the catalyst of the present invention may be defined in the specification and claims as a structure which has been formed by a selective corrosion and surface etching of the particle, the catalytic material remaining substantially unattacked by the corroding and etching agent and the catalytic molecules and atoms contained in the structure of the particle remaining in substantially the same positions relative to each other as before such treatment. In other words, the particle suffers no substantial change in peripheral dimensions nor distintegration of the structure of the catalytic material and the removal of the undesired constituent from the particle thus permits a molecular or atomic etching on the periphery of the particle and on the surfaces of the pores or foramina thereof. The surface which has resulted from this selective corrosion and etching action, carries a large number of molecules or atoms which have been partially liberated from the mass and which possess a high degree of valence unsaturation. This particle structure has not been attained by any process prior to that of the present invention.

The increased catalytic activity caused by this corroded or foraminate structure may be explained, possibly, by the theory of chemical adsorption on the atoms of a particle as measured by the unsatisfied crystal valences of these atoms. According to this theory, an atom in the interior of the particle mass possesses no adsorption activity whatever since all its valences are satisfied. However, as atoms become more and more independent of the mass, they become more and more active. Thus, an atom on the surface has one unsatisfied valence and, consequently, is capable of a slight chemically adsorptive activity. Similarly, atoms on the edges have two valences unsatisfied and those on the corners have three valences unsatisfied; and their activity is proportionately increased. Atoms projecting from the surface, however, may have as many as five unsatisfied valences and are, consequently, the most active of all. It would seem highly likely that a corroded, loosely knit structure such as that of the individual particles of the catalysts of the present invention, would afford a maximum of projecting atoms, since many atoms imbedded in the mass of the starting material are more or less liberated therefrom by the corrosion resulting from the removal treatment. If this be the case, an explanation of the very superior catalytic activity of these catalysts is apparent, for catalytic action may be considered a phase of chemical adsorption wherein the reacting substances are adsorbed on the catalytic atoms either in molecular or in merely atomic condition and are thus enabled very readily to contact and react with one another. However this may be (and it seems to be a reasonable explanation of the phenomena observable in this instance), I do not wish to be understood as asserting it is the actual explanation, since there is not a general agreement among scientists either as to the nature of catalysis or as to reactions taking place in chemical adsorption. It is a fact, nevertheless, that the corroded, foraminate catalyst of the present invention is far more active than either the smooth or the porous catalysts at present known.

The prior art has taught that in a given material catalytic efficiency depends entirely on the extent of the particle surface of the catalytic material. While it is undoubtedly true that with a surface material of a given catalytic efficiency, a larger surface of the same material will be more efficient, the prior art has never recognized that the physical character of the surface is of any importance. The present invention is more concerned with the nature or character of the available surface of the catalytic material than with its extent.

In the prior art it has been prescribed that the particles of a catalyst should be in a very finely divided condition in order to increase the surface area thereof and thus increase its activity. Some inventors have even sought to produce colloidal or semi-colloidal catalysts usually precipitated upon a carrier, and others believe that an increased surface area may best be obtained by rendering the catalyst porous. But neither such a fine division nor mere porosity as such are characteristics of the catalyst of the present invention; for the particles are relatively larger than those of catalysts at present known, and they do not possess such a type of porosity as has been sought by prior workers.

While the corroded particles of the present invention, perforate as they undoubtedly are as a result of the treatments, may in a physical sense be called porous, the porosity, as such, in the view of the present invention, is not of catalytic value. This is only an incident of the process to which they have been subjected. The superior catalytic activity is due to the fact that the agent which removes the undesired material, in eating into the mass of the particles, has partially liberated from the mass a larger number of active molecules or atoms, even on the walls of the perforations, and these atoms have probably acquired as a result of the removal treatment more unsatisfied valences than they had before.

This will be evident from the following specific examples which illustrate a method of preparing typical catalysts according to the present invention.

Example 1

In order to prepare a nickel catalyst for the hydrogenation of oils, a nickel aluminate (3 $NiO.Al_2O_3$) is leached with a solution of sodium hydroxide (NaOH). The nickel aluminate ground to about 200 mesh in size is leached with a sufficiently concentrated solution of the sodium hydroxide to remove a substantial quantity of the oxide of aluminum. This solution may be of varying strength but the time of the treatment will be longer or shorter as the solution is weaker or stronger. However, a very strongly concentrated solution is not desirable as it has a tendency to disintegrate and crumble the particles of the catalyst to a fine powder and so diminish the efficiency resulting from the foraminate form. I have in the case of nickel aluminate obtained excellent results by leaching with a 30% solution of NaOH for an hour or an hour and a half. Sodium hydroxide of this strength dissolves out most of the $Al_2O_3$ and leaves as a residue mainly nickel oxide NiO. Such aluminum oxide as may remain in the mass of the particles is embedded in surrounding nickel oxide so that the leaching solution is unable to gain access to it under the conditions of the leach. The NiO is then filtered, dried, crushed and reduced at say 450°—500° in a hydrogen atmosphere, to metallic nickel in the foraminate form which has been described. This is the catalyst.

Example 1—a

Another illustration of the preparation of a nickel catalyst for the hydrogenation of oils is as follows: Nickel chromate ($NiCrO_4$) comprising particles of the order of 200 mesh is digested with sodium hydroxide. The solution of NaOH in this instance should normally be somewhat more dilute than in the case of nickel aluminate. I have found good results with a 15% solution of NaOH for several hours at a slightly elevated temperature, say 90° C. The chromium compound is thus dissolved to a greater or less extent and the nickel residue is filtered, dried and then reduced in hydrogen at about 300° to 350° C.

Example 2

For a manganese catalyst, (for instance, manganese dioxide for the oxidation of carbon monoxide), manganese sesquioxide ($Mn_2O_3$) is digested in successive dilute solutions of sulphuric acid, preferably of increasing concentration, and at temperatures approximating room temperatures, for a period of time sufficient to cause the removal of a substantial proportion of the soluble portion of this compound. In this connection it should be noted that manganese sesquioxide comprises both divalent and tetravalent manganese. The sesquioxide, usually denoted by the empirical formula $Mn_2O_3$, may be seen to comprise a manganous salt of manganous acid $H_2MnO_3$ which may be written $MnO.MnO_2$ or $MnMnO_3$ and may well be termed manganous manganite corresponding to the structural formula

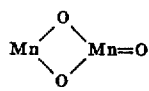

The MnO may be removed from this compound, for instance by treating it with sulphuric acid and converting the divalent manganese into the sulphate:

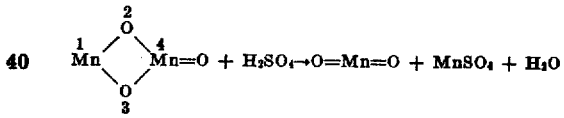

From the foregoing it can be readily perceived that the manganese atom (1) and the oxygen atom (2) are removed from the compound while the remaining oxygen atom (3) attaches itself by a double bond to the manganese atom (4), so that the resulting manganese compound is $O=Mn=O$ or $MnO_2$. The manganese atom (1) is taken up in the sulphate as shown and the oxygen atom (2) is taken up with the hydrogen as water. By removing the MnO, the total volume is not materially less than that of the original material, but the weight, speaking in terms of atomic weights, has been reduced by 71/158ths or about 45%, leaving the $MnO_2$ in an extremely corroded condition.

After the above described digestion, the insoluble product may be filtered, washed, pressed, crushed, sized, and dried slowly, say at 100° C., from twelve to eighteen hours, followed by a more intensive drying of two or three hours at more elevated temperatures, say 200° C. The resulting product possesses a corroded foraminate form and is a highly active catalyst capable of oxidizing carbon monoxide at room temperatures and at 0° C.

General

It should be noted that there are various factors which must be carefully considered and regulated in following out any of the preceding specific examples which are illustrative of the invention only. These factors might be termed variables affecting the activity of the resulting catalyst and will be described briefly in order that the principles of the invention may be more readily understood:

1. Concentration of digesting solutions

This is an important factor to be considered in obtaining an efficient active catalyst. The physical structure of the product, as previously indicated, is one in which the individual particles have been corroded so that an appreciable amount of soluble material has been eliminated therefrom without greatly reducing the size of the particle. This foraminate structure must be preserved and I have found, generally, that vigorous and intensive chemical treatments tend to destroy this structure. Therefore, it is important that the leaching or digesting procedure be carried out with extreme care and in general a gradual progressive chemical reaction is to be preferred over a violent and vigorous one. Accordingly, as in Example 2 above mentioned, the manganese compound is preferably treated with a very dilute acid solution, for instance 2% sulphuric acid, this in turn being followed by a more intensive treatment, for instance with a 5% solution of sulphuric acid.

2. The temperature of digestion

This factor should also be regulated with a view to preventing a too vigorous treatment of the compound to be leached and the concomitant disintegration of the physical structure of the resulting compound. Accordingly, relatively low temperatures should generally be utilized.

3. Time

This factor should be correlated with factors 1 and 2 for the same reasons that have been advanced.

4. Ratio of soluble to insoluble constituents

It is apparent that the physical structure of the element or compound which is made catalytic in accordance with the teaching of the present invention must necessarily depend upon the proportion of soluble to insoluble constituents in the material which is subjected to the solvent action. Thus, in the case illustrated in Example 2, the composition $Mn_2O_3$ or $MnOMnO_2$ contains soluble divalent and insoluble tetravalent manganese in a 1:1 molecular ratio, and the leach should be directed toward the removal of substantially one-half of the material treated without diminishing the size greatly in the production of the corroded catalytic residue. Again, in Example 1, the molecular ratio of the soluble alumina to the insoluble nickel oxide is 1:3; the starting material, therefore, contains a less proportion of insoluble material and consequently the intensity of the leach may be decreased.

5. Drying Treatment

This factor depends in importance on the conditions under which the starting material is prepared. The starting material may be prepared in a form that is quite dry and granular. If it is prepared by a recipitation method, it is generally in a moist condition. In such case the aggregate forming the starting material will yield too readily to the subsequent leach, with the result that the material coming from the leaching treatment will be in a condition inconsistent with the corroded, foraminate structure that is desirable in a catalyst of high efficiency which is the product of the present invention. For example, in the case of precipitated nickel aluminate, if this material were subjected directly to the leach, it is likely that it might result in a material that, while chemically the same, would not possess the high efficiency of the catalyst of the present invention. However, by subjecting this precipitate to an ignition or drying treatment, a dry granular material is produced which, when leached in the manner above described, comes out in corroded particles from which the aluminum oxide has been, to a large extent, dissolved. In this case, the ignition or drying treatment may be carried on with excellent results at 100° C. or a little higher. In the case of nickel chromate, a somewhat higher temperature should be employed.

6. The particle size of catalyst

The insoluble product remaining after the removal of the soluble foreign material need not be of a particularly small particle size, but I have found that, in the case of a nickel catalyst, particles of the fineness of about 200 mesh or smaller are preferable when it is used for hydrogenation in the liquid phase. However, there is a minimum limit to the size of particle capable of utilization with the present invention, this size being that beyond which a loss of projecting atoms, according to the theory of unsatisfied valences, above referred to, would not be counteracted by the increased surface exposed by the smaller particles. The precise point at which the optimum activity of the product is obtained can undoubtedly be ascertained by careful experiment, yet for practical purposes I have found that particles of the order of fineness of 200 mesh are eminently satisfactory for most catalyses.

7. Reduction conditions

This factor, of course, applies to cases where a metal catalyst is desired. The conditions of reduction are, as in the case where the concentration of digesting solutions were considered, best regulated so that the particle structure so carefully constructed, may not be disrupted. The temperature range of reduction is undoubtedly dependent upon the surface structure of the particles comprising the material to be reduced, and this, as previously indicated, is dependent upon the ratio of solubles to insolubles. Thus, with a starting material containing a relatively large proportion of soluble material, a less intense reduction is in order, whereas with a starting material containing a relatively small proportion of solubles, a more intense treatment should be used. The proper balance between these factors will be apparent to those skilled in the art.

While the illustrative embodiments of the invention have been given in order to depict simple embodiments for facility of explanation, it should be understood that the principles of the invention may be practised in other, and, perhaps, more extended ways than as indicated in these examples. Instead of using simple compounds, such as nickel and aluminum, or nickel and chromium, it is possible to use a mixture of compounds, the insoluble constituents of which may be reduced in order to produce a mixture of catalytic materials. For instance, a mixture of nickel and copper aluminates may be treated in accordance with the principles of the invention, and a nickel-copper catalyst obtained which may be utilized in a number of catalyses. Again, an iron oxide catalyst adapted, for example, for the oxidation of hydrocyanic acid gas or wherever an iron oxide catalyst may be used, may be prepared by drying a precipitate of iron aluminate ($Fe_2O_3Al_2O_3$) at a slightly elevated temperature, say 110° C., and leaching out the alumina, or a substantial proportion of the same by a dilute solution of sodium hydroxide (of the order of 10% solution) at approximately room temperature. The residue may be filtered, washed, pressed, and otherwise processed (as in the case of the specific examples preceding) in order to obtain an active iron oxide.

The invention is not limited to the treatment of oxy-compounds but is adaptable to the treatment of sulphides or other compounds which contain a desired element or combination suitable to be processed to a foraminate, corroded, catalytic condition.

In order to obtain a compound in which soluble and insoluble substances are present in proper proportion, and which are susceptible to the elimination of a substantial amount of the non-catalytic constituent in order that the catalytic residue may be segregated, it is possible in some cases to subject raw ores to a simple reduction treatment designed to produce the requisite proportion of constituent substances. Thus as described and claimed in my co-pending application Ser. No. 635,869 filed October 1, 1932, a manganese ore such as pyrolusite (consisting chiefly of manganese dioxide—$MnO_2$) may be quite readily converted into manganese sesquioxide ($Mn_2O_3$) by reduction with methanol, hydrocarbon gas, etc. Even lower oxides may be formed in this manner, but it should be borne in mind that the degree of reduction will affect the composition of the material obtained and this, depending upon the ratio of solubles to insolubles, must be considered in determining the particular conditions of subsequent treatment. In the form of the sesquioxide, the manganese is present in divalent as well as tetravalent form in which it is available for use as a starting material to be leached. Of course, other manganese materials may be found which are susceptible to being reduced to the form of the sesquioxide preparatory to the leaching treatment, and these materials may be prepared otherwise than directly from the ores. In this connection it should be understood that the invention may be applied to the treatment of $Mn_2O_3$ or $Mn_3O_4$, either prepared artificially or as found in nature; for instance, as braunite or hausmannite,—these compounds being available for treatment with the leaching material as they are already in the form of an oxide lower than $MnO_2$ and contain appreciable quantities of manganese in divalent form. As above indicated, however, the ratio of solubles to insolubles is the main factor to be examined in considering the expediency of using these compounds in the present process.

Furthermore, while the illustrative examples hereinabove given have been such as employ an aqueous leach, good results may be obtained with other solvents, such as organic solvents. Gaseous reagents may also be used and, in fact, other reagents that may be adapted to corrode the particles of the beginning material in the manner described. In general, as has been hereinabove stated, the undesired constituents of the beginning material are to be removed from the particles thereof by an appropriate agent without materially reducing the size of the particles and leaving the catalytic residue in the form of foraminate particles as described.

What I claim is:

1. A catalyst comprising particles in a corroded foraminate form.

2. A catalyst comprising particles comprising divalent and tetravalent manganese from which the divalent manganese has been substantially dissolved thereby leaving a catalytic material the particles of which include substantially tetravalent manganese in a corroded foraminate form.

3. A substantially dry, broken up catalyst prepared from a mass containing at least one desired element and at least one undesirable element, from which mass a substantial amount of said undesirable material has been removed by a treatment which considerably reduces the mass without materially reducing the size of the particles.

4. The process of producing a foraminate structure in catalytic particles, comprising forming into particles a mass containing the desired catalytic constituents and other constituents, and corroding the particles by gradually dissolving therefrom a portion of the said other constituents.

5. The process of producing a foraminate structure in catalytic particles comprising forming into particles a mass containing the desired catalytic constituents and other constituents, corroding the particles by gradually dissolving therefrom a portion of the said other constituents, and then removing the dissolved portion.

6. The process of producing a foraminate structure in catalytic particles comprising forming into particles a mass containing the desired catalytic constituents and other constituents, corroding the particles by dissolving and removing therefrom a portion of the said other constituents while preserving the thus obtained foraminate structure of the particles.

7. The process of producing a foraminate structure in catalytic particles comprising forming a mass into suitable particles, and gradually dissolving from said particles a portion of the undesirable constituents thereof.

8. The process of producing a foraminate structure in catalytic particles comprising forming a mass into suitable particles, gradually dissolving from said particles a portion of the undesirable constituents thereof, and then removing the same.

9. The process of producing a foraminate structure in catalytic particles comprising corroding a uniform mass in particle form containing at least one element soluble in a given solvent and at least one element insoluble in said solvent, by gradually dissolving a portion of said soluble material, then filtering, washing, drying and breaking up said residue while preserving the corroded foraminate structure of the particles of said residue.

10. The process of preparing a foraminate structure in catalytic particles comprising corroding a uniform mass in particle form containing desired catalytic constituents and other constituents by gradually dissolving from said particles a portion of said other constituents, removing the dissolved constituents, and then reducing the residue.

11. A catalyst comprising corroded, foraminate particles containing at least one desired constituent and at least one undesirable constituent, the active surfaces of said particles being substantially free from the undesirable material.

12. A catalyst comprising corroded, foraminate particles containing at least one desired constituent and at least one undesirable constituent, voids in said particles, said voids being formed by the removal of a portion of said undesired material, the available surface of said particles including the surfaces of the voids being substantially free from the undesirable material.

13. A catalyst prepared from particles consisting of nickel oxide and an oxide of another metal, which particles a portion of the other constituent has been removed, the residue, after being subjected to a reducing action, comprising particles essentially of nickel in a foraminate form.

14. A catalyst prepared from particles consisting of nickel oxide and an oxide of another metal, from which particles a portion of the other metal oxide has been removed, the residue, after being subjected to a reducing action, comprising particles essentially of nickel in a foraminate form.

15. A process for forming a foraminate structure in catalytic particles, which comprises first the production of particles consisting of constituents at least one of which is soluble in a given solvent and other constituents which are not so soluble; and then subjecting said particles to the gradual action of said solvent, thus dissolving out a portion of the soluble constituents and leaving coherent catalytic skeletons consisting mainly of the insoluble material in a corroded form.

16. A process for forming a foraminate structure in catalytic particles, which comprises first the production of particles consisting of metal-containing constituents at least one of which is soluble in a given solvent and other constituents which are not so soluble; then subjecting said particles to the gradual action of said solvent, thus dissolving out a portion of the soluble constituents and leaving coherent catalytic skeletons consisting mainly of the insoluble material in a corroded form; and then reducing said skeletons while retaining their coherent character.

17. A foraminate catalyst comprising particles from which an appreciable mass has been removed by corrosion to form irregular interstices, the non-corroded portions thereof being partially liberated from the original mass but otherwise unchanged from the position and condition which they possessed prior to the removal of the said mass.

18. Catalytic particles prepared from particles containing a catalytic material and another material, said catalytic particles containing interstices throughout the mass thereof and formed by the removal from the original particles of a portion of said material, the physical structure of the particles remaining after said removal comprising a skeleton of the desired catalytic material but being otherwise substantially unchanged from the physical structure possessed by the original particles, there being substantially no reduction in size of said particles.

19. A substantially dry, broken-up catalyst prepared from an aggregate containing at least one constituent unaffected by a given reagent and at least one constituent that may be removed by said reagent, from which aggregate a portion of said removable material has been eliminated by treating with such reagent, the residue consisting of the unaffected catalyst in the form of corroded foraminate particles.

20. A substantially dry, broken-up catalyst prepared from an aggregate containing at least one constitutent insoluble in a given solvent and at least one constituent soluble in said solvent, from which aggregate a portion of said soluble material has been dissolved by mild treatment with said solvent, the catalytic residue remaining in corroded, foraminate particle form.

21. A catalyst prepared from a mass of uniform particles comprising desirable catalytic constituents and constituents undesirable for the purposes of the catalysis for which the catalyst is intended, consisting of particles comprising the catalytic constituent in foraminate form, the undesirable material having been partially dissolved therefrom without substantial change of the particle size.

22. A catalyst according to claim 21 in which the catalytic particles have been diminished in weight.

23. A catalyst according to claim 21 in which the catalytic particles have been diminished in weight but in which the catalytic atoms or molecules have been partially liberated from the original mass without change in their relative positions.

24. A manganese dioxide prepared from manganese sesquioxide by removing therefrom substantially all the divalent manganese therein.

LESLIE G. JENNESS.

CERTIFICATE OF CORRECTION.

Patent No. 1,937,489.   November 28, 1933.

LESLIE G. JENNESS.

It is hereby certified that error appears in the printed specification of the above numbered patent requiring correction as follows: Page 3, line 142, for "recipitation" read precipitation; page 5, line 80, claim 13, for "an oxide of another metal," read another constituent, from; and that the said Letters Patent should be read with these corrections therein that the same may conform to the record of the case in the Patent Office.

Signed and sealed this 16th. day of January, A. D. 1934.

(Seal)

F. M. Hopkins
Acting Commissioner of Patents.

21. A catalyst prepared from a mass of uniform particles comprising desirable catalytic constituents and constituents undesirable for the purposes of the catalysis for which the catalyst is intended, consisting of particles comprising the catalytic constituent in foraminate form, the undesirable material having been partially dissolved therefrom without substantial change of the particle size.

22. A catalyst according to claim 21 in which the catalytic particles have been diminished in weight.

23. A catalyst according to claim 21 in which the catalytic particles have been diminished in weight but in which the catalytic atoms or molecules have been partially liberated from the original mass without change in their relative positions.

24. A manganese dioxide prepared from manganese sesquioxide by removing therefrom substantially all the divalent manganese therein.

LESLIE G. JENNESS.

CERTIFICATE OF CORRECTION.

Patent No. 1,937,489.   November 28, 1933.

LESLIE G. JENNESS.

It is hereby certified that error appears in the printed specification of the above numbered patent requiring correction as follows: Page 3, line 142, for "recipitation" read precipitation; page 5, line 80, claim 13, for "an oxide of another metal," read another constituent, from; and that the said Letters Patent should be read with these corrections therein that the same may conform to the record of the case in the Patent Office.

Signed and sealed this 16th day of January, A. D. 1934.

(Seal)

F. M. Hopkins
Acting Commissioner of Patents.